(12) United States Patent
Townsend

(10) Patent No.: US 6,850,819 B1
(45) Date of Patent: Feb. 1, 2005

(54) IRRIGATION CONTROL SYSTEM

(75) Inventor: James Dunstone Townsend, Hahndorf (AU)

(73) Assignee: Irrigation Control Networks Pty Ltd, Adelaide (AU)

( * ) Notice: Subject to any disclaimer, the term of this patent is extended or adjusted under 35 U.S.C. 154(b) by 0 days.

(21) Appl. No.: 09/646,638
(22) PCT Filed: Mar. 19, 1999
(86) PCT No.: PCT/AU99/00175
§ 371 (c)(1), (2), (4) Date: Sep. 20, 2000
(87) PCT Pub. No.: WO99/48354
PCT Pub. Date: Sep. 30, 1999

(30) Foreign Application Priority Data

Mar. 20, 1998 (AU) .............................. PP2475

(51) Int. Cl.⁷ ................................................ G05B 7/00
(52) U.S. Cl. ...................... 700/284; 700/204; 137/78.2; 239/14.1
(58) Field of Search ................................ 700/204, 284; 137/78.2; 239/14.1

(56) References Cited

U.S. PATENT DOCUMENTS 5,023,787 A * 6/1991 Evelyn-Veere .............. 700/284
5,717,589 A * 2/1998 Thompson et al. ............. 702/3
6,076,740 A * 6/2000 Townsend ...................... 239/1

FOREIGN PATENT DOCUMENTS

WO      WO97/27733       8/1997

OTHER PUBLICATIONS

PCT International Search Report dated Apr. 13, 1999.

* cited by examiner

*Primary Examiner*—Leo Picard
*Assistant Examiner*—Sheela S. Rao
(74) *Attorney, Agent, or Firm*—Gottlieb Rackman & Reisman

(57) ABSTRACT

An irrigation control system for land comprising: (a) at least one meter to measure one or more wheather conditions in a first area; (b) at least one monitor to (i) examine rainfall data derived from a radar scanning at least the first area according to predetermined criteria and (ii) to extract data which is representative of the scanned rainfall in a sub-area of the first area; (c) a store to store the extracted data; and (d) a controller connected directly or indirectly to the meter and the monitor and to the store, to calculate a moisture content value for the sub-area and a predetermined moisture content value for the sub-area, and to regulate the irrigation in a sub-area.

17 Claims, 1 Drawing Sheet

IRRIGATION CONTROL SYSTEM

CROSS-REFERENCES TO RELATED APPLICATIONS

Figure 1:
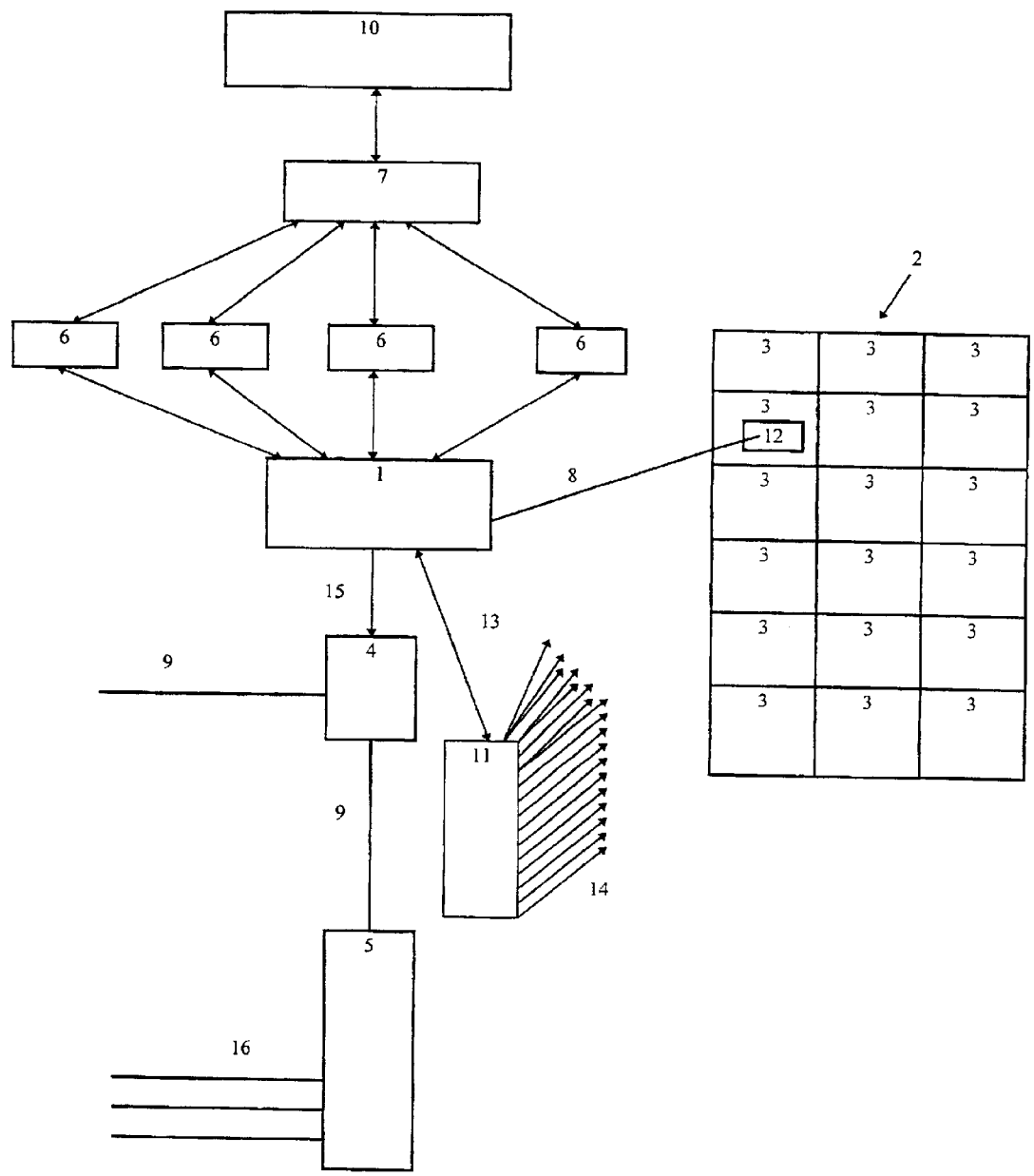

This application is a U.S. national application of international application Ser. No. PCT/AU99/00175 filed Mar. 19, 1999, which claims priority to Australian Provisional Patent Application No. PP2475 filed Mar. 20, 1998.

FIELD OF THE INVENTION

The invention relates to an irrigation control system for a predetermined area. In particular, scheduling and management of urban irrigation of parks, gardens and sports facilities of a large city.

BACKGROUND OF THE INVENTION

Controllers to start and stop irrigation cycles without human intervention are well known. These controllers send an electric current (usually 24 volt alternating current in horticultural or agricultural use) to a remote solenoid valve, causing the valve to open. Valve closure is usually effected by discontinuing the supply of electric current to the solenoid of the valve whereupon the valve is caused to close.

Most of these types of controllers are able to handle a number of valves, opening and closing them in a programmed succession for programmed times on programmed days of the week. This series of sequential valve opening and closing on specified days is generally referred to as "a program" or "an irrigation program". Many of the known controllers are capable of storing and executing more than one irrigation program, which adds a degree of flexibility to what the controller may accomplish.

Basically these prior controllers fall into one of three categories as follows:

1. Relatively inexpensive controllers which are capable of executing an irrigation program. These controllers are not capable of changing the set irrigation program in any way to take account of differing water needs of plants occasioned by variations in meteorological conditions.

Controllers of his type constitute well over 90 percent of all irrigation controllers currently in use in Australia. Such controllers will, if the irrigation program is not regularly modified inevitably waste considerable quantities of water, since it will be programmed to supply sufficient water to serve the needs of the plant being irrigated during periods when plant demand for water is high. Thus when the same application of irrigation water continues during periods of low plant water requirement. wastage occurs.

The potential to save water by in effect harvesting rainfall by discontinuing irrigations until that rainfall finds its way into the root-zone and is transpired by the plants, is lost unless the controller can be manually de-activated. When managing large numbers of such controllers, particularly over a wide area, it is generally not possible to manually de-activate them and re-activate them when irrigation should commence.

Additionally, such controllers are incapable of responding to occurrence of rain periods unless coupled to some specialist sensor designed for the purpose. Whilst such sensors are known they tend to be either expensive (and consequently little used) or unreliable (and again little used).

2. More expensive controllers which can alter the frequency and amount of irrigation, either up or down, as time passes in an effort to match applications to plant requirements. Such devices usually impute likely plant requirements by use of meteorological averages developed from examination of many years of meteorological records relating to the geographical area under consideration. This type of controller is an improvement upon the first described type of controller, but is still arbitrary and inflexible as it relies on averages that must inevitably waste water when the predicted conditions do not occur. Additionally, there can be no improvement in harvesting rainfall.

3. Expensive controllers which either accept direct input from automatic weather stations, or accept meteorological information directly or indirectly from a remote weather station or climatic recording facility. These controllers use such information to modify a basic program so that irrigation water applications are substantially in accord with actual plant requirements. These controllers may also be activated to apply a predetermined irrigation cycle when instructed to do so by a remote software program which accepts meteorological input and maintains a water budget for the area. However, such controllers do not utilise localised rainfall measurement and consequently irrigation management depends upon rainfall information indicative of a wider area than the irrigation area. Water wastage can result. Further, these controllers must be part of a very wide network which means that over a wide area very considerable telephony or radio costs are necessarily involved.

Another approach is described in our pending patent application no. PCT/AU97100056 the content of which is incorporated herein. In that application, the control system is based upon a method of irrigating land which includes the steps of:

(a) measuring one or more weather conditions in a first area;
(b) measuring rainfall in a sub-area of the first area;
(c) monitoring the measurements;
(d) calculating a moisture content value for the sub-area from the measurements and a predetermined moisture loss for the sub-area; and
(e) regulating the irrigation of the sub-area.

Key to this approach is the combined use of one or more weather conditions in the first area and the rainfall in the sub area. In implementing certain forms of that invention, it has become apparent that where large numbers of sub-areas (such as parks, gardens and sports facilities) need to be managed by the system, special practical economic difficulties may arise.

If individual actual measurement is needed of a large number of sub-areas, it would be necessary to place at least one weather station including a tipping bucket (or other) type of pluviometer, in an appropriate position in each sub-area. This could be as often as 500 meters apart. However, weather stations are expensive and a very common characteristic of rainfall is that it can be extremely variable in amount and distribution even over a small area. For example, well over 1000 stations would be needed in even a small city to establish a network. Thus to produce reliable data using such pulviometers is an expensive undertaking.

Accordingly, improved and more economic resolution of rainfall information over a wide area is important in the management of individual sub-areas. In addressing this issue it has been found that one source of potentially useful data for this purpose is readily available.

In this respect, at present meteorological weather radars are commonly installed to cover the area of major cities. The output of these radars is a stream of data organised in the following fashion:

Radially—each degree of rotation from 000 through to 360 is reported separately.

Longitudinally—for each degree of rotation, data is presented as a series of rain intensity figures, typically for each kilometre along each of the radii. For example 095/35/9 may mean that rain intensity of "9" is falling 35 kilometres from the radar transmitter on a bearing of 095 degrees from the transmitter.

This data is analysed by a high-speed computer to produce the familiar radar screen views commonly seen on television weather reports.

OBJECT OF THE INVENTION

It is an objective of the present invention to provide an irrigation control system which ameliorates the disadvantages referred to above especially where there is a large number of sub-areas which need to be controlled.

SUMMARY OF THE INVENTION

According to one form of the invention, an irrigation control system for land is provided which comprises:

(a) at least one meter to measure one or more weather conditions in a first area;

(b) at least one monitor to (i) examine rainfall data derived from a radar scanning at least the first area according to predetermined criteria and (ii) to extract data which is representative of the scanned rainfall in a sub-area of the first area;

(c) a store to store the extracted data; and (d) a controller connected directly or indirectly to the meter and monitor and to the store, to calculate a moisture content value for the sub-area and a predetermined moisture content value for the sub-area, and to regulate the irrigation in a sub-area.

Preferably, regulation of irrigation in the sub-area is either by initiating or preventing irrigation of the sub-area depending upon whether the moisture content value is less than or more than a predetermined moisture content value for the sub-area.

Typically, there will be one monitor.

Preferably the weather conditions measured include solar radiation.

Preferably, the monitor is integrated with the controller.

Preferably, the controller is a computer.

According to a preferred form of the invention, the irrigation control system further comprises a local switch in the sub-area to initiate or prevent irrigation in response to signals from the controller.

According to another preferred form of the invention, the local switch in the sub-area activates or de-activates a local controller for initiating or preventing the irrigation, in response to signals from the controller.

According to another preferred form of the invention, the irrigation control system further comprises an interrupter to interrupt irrigation in the sub-area. Preferably, this interrupts irrigation in the sub-area in response to rainfall in the sub-area. Typically, the interruption occurs for a period of time determined by the controller.

In another independent aspect of the invention, a method of irrigating land is provided which comprises the steps of:

(a) measuring one or more weather conditions in a first area;

(b) examining rainfall data derived from a radar scanning at least the first area according to predetermined criteria and extracting data which is representative of the scanned data in a sub-area of the first area;

(c) storing the extracted data;

(d) calculating a moisture content value for the sub-area and a predetermined moisture content value for the sub-area; and (e) regulating the irrigation of the sub-area.

Preferably the regulation of the irrigation of the sub-area is either by initiating or preventing irrigation of the sub-area depending upon whether the moisture content value is less than or more than a predetermined moisture content value for the sub-area.

Preferably, the measurement in step (a) is carried out in the same sub-area as that in which the measurement is carried out in step (b).

Preferably the method comprises a further step of: (f) sensing for rainfall in the sub-area during irrigation and interrupting irrigation in response to rainfall in the sub-area.

Using the system and method described above, it is possible to more accurately manage the irrigation of an area and minimise over irrigation and hence wastage of water.

DESCRIPTION OF A PRACTICAL EMBODIMENT

The invention will now be further explained and illustrated by reference to the following practical embodiment concerning steps (b) and (c) of the control system when dealing with the radar data.

As stated above, at present meteorological weather radars are commonly installed to cover the area of major cities. In the current example this area would be seen as the first area. The output of these radars is a stream of data organised in the following fashion:

Radially—each degree of rotation from 000 through to 360 is reported separately.

Longitudinally—for each degree of rotation, data is presented as a series of rain intensity figures, typically for each kilometer along each radii. For example 095/35/9 may mean that rain intensity of "9" is falling 35 kilometers from the radar transmitter on a bearing of 095 degrees from the transmitter.

This radar data may be processed as follows according to one aspect of the invention.

1. Firstly a "plane geometry" program is created and initialised. This software program, on being programmed with the longitude and latitude of the radar transmitter, is able to express any longitude and latitude pair in the scanned range of the transmitter, as a radial and longitude address in terms of the data stream emanating from the radar transmitter. This results in the production of weather radar data particular to any site (sub-area) within the coverage area (first area) of the radar. This in turn means such particular data may be identified, extracted and stored along with a time stamp by a computer.

2. The size and pattern of the network of rainfall assessments in the sub-areas to be managed is decided upon and programmed into the plane geometry software program to create the sites of a virtual rain gauge.

3. The latitude and longitude of each virtual rain gauge can now be established and accurate radar addresses for each site can be computed.

4. The radar address of each site can then be stored and an interrogating computer programmed to extract and store the data for each address so identified every time it appears in the data stream coming from the radar transmitter. If the radar beam sweeps through 360 degrees every 10 seconds, then one piece of data will be stored for each virtual rain gauge site each 10 seconds.

5. This rainfall intensity data is examined for the existence of significant rain by integrating this information with time.

Consequently, by use of this technique, rainfall data for any array of points defined within the area of coverage of a weather radar can be inexpensively collected without the necessity for expensive actual rain measurement equipment. This makes possible a variety of irrigation/water management techniques which would otherwise be impossible due to lack of resolution of rainfall data.

The invention will now be further explained and illustrated by reference to the accompanying drawing in which:

FIG. 1 is a schematic diagram of one form of the invention.

In overview, the system depicted includes a controller which is a main computer 1 which communicates directly or indirectly with at least one radar 11. The main computer 1 examines rainfall data derived from the radar 11 which scans at least the first area 2 according to predetermined criteria. The main computer 1 also examines and extracts data from the radar 11 which is representative of the scanned rainfall in a sub-area 3 of the first area 2. There is at least one weather station 12 in the first area 2. The weather station 12 can measure weather conditions such as radiation and temperature. Main computer 1 also communicates with the weather station 12 and can calculate the moisture content value for a particular sub-area 3.

Main computer 1 also communicates with one or more switches 4 typically by a paging network 15. Each of these switches is associated with a preexisting irrigation controller for a particular tract of land. Each switch 4 is controlled by the main computer 1 and closing or opening switch 4 permits or prevents the pre-existing irrigation controller 5 from irrigating the tract of land according to its own programmed cycle. The pre-existing irrigation controller 5 may have field wires 16 which can be used to activate irrigation in each sub area 3.

It will be understood by those skilled in the art that a system for irrigation can be set up in a variety of ways. Two methods are particularly described as 'fail wet' or 'fail dry'. In a fail wet system, the resting state of the system is such that irrigation is possible. In the preferred form of a fail wet system, at about 7.00 pm all switches are activated and remain in this state until the preferred irrigation period is finished. In this state irrigation is prevented. It is necessary for the controller 1 to change the state of switches 4 for those sub-areas 3 which require irrigation. The circuits for these sub-areas 3 then enable. Once irrigation has concluded the switches 4 will return to the 'off' state. When the irrigation period as a whole is finished all circuits will return to their resting state-ie. irrigation possible. Water, however, will generally not be supplied during this period, except as may be required by on-site supervisors for particular purposes.

A fail dry system is opposite to a fail wet system.

It will be understood that both fail wet and fail dry systems can be utilised with this invention. However, fail wet systems have the advantage of more easily permitting the testing of the system during the period when the switches are in their resting state. As a general rule, irrigation will preferably occur during the evening or night as it is coolest then and less of the water provided by way of irrigation is lost. If this is the case the switches 4 will be in their resting state during the day when it is most likely workmen would be testing them.

Where users require external access to the system, to review and/or alter the irrigation control system settings for a particular site, a dial up facility is provided. External users 10 will access a network of computers 6 via a call sequencer 7. The user 10 enters by security identification and identification of the particular site. The user 10 is then given access to the weather information and the settings for that particular site which have been down loaded to the network computer 6 from the main computer 1. The user 10 may change the settings and this information is then transmitted to the main computer 1.

A typical implementation procedure for the irrigation control system as depicted is as follows.

The area 2 in which the irrigation is to be controlled is defined. In most cases this will be the greater metropolitan area and environs of a large city, or the general area and environs of a provincial city, or the area covered by a town.

Once the overall area is defined, it is further divided into sub-areas 3. A sub-area 3 is defined by a common or similar microclimate. Sub-areas may also be defined by areas which provide different facilities ie. different sports facilities or parks. This division is necessarily subjective and will usually contain inaccuracies, however, this does not markedly affect the operation of the system and does not interfere with the system achieving efficient irrigation management outcomes. It is possible to 'fine tune' the system if necessary.

Typically, a large metropolitan area and environs of a city, eg one million people, may contain 10–15 sub-areas 3. These sub-areas 3 will be identified by a number.

To define sub-areas 3, a number of empirical factors are used including:

General orientation (North, South etc.)

Landform (plain, valley area, slope)

Overall land use

Density of buildings, etc.

Once the overall area has been defined and then further sub-divided into (10–15) sub areas 3, the following external support network is put in place. The radar 11 scans the entire first area 2 according to predetermined criteria. This is done via radar 'communication' system 14. The main computer 1 examines the scanned rainfall data derived from the radar 11. The scanned rainfall data may be stored by the radar 11 or by the main computer 1. Alternatively it may be stored elsewhere. The main computer 1 also examines and extracts data which is representative of scanned rainfall in a sub-area 3 of the first area 2. The radar 11 is connected to main computer 1 by communication system 13. Each weather station 12 is also connected to main computer 1 by communication system 8 (usually telephone or radio or a combination of both). As indicated above, at least one weather station 12 may be installed in the overall first area 2 and not specifically in each sub-area 3. In another alternative (not shown) it is possible to install one weather station 12 within each sub-area 3. In another alternative (not shown) there may be a combination of those alternatives.

Each site to be irrigated is surveyed with a view to accurately establishing the following:

Area (sq.m) to be irrigated.

Root Zone Depth (RZD). This is a sensible site range.

Precipitation Rate (or rates) of the irrigation system.

Soil texture (or textures) within the root zone.

With the data from the above, calculations can now be done to establish the following:

Total Available Water (TAW (mm)=RZD(cm)×SMHC where SMHC (Soil moisture holding capacity is typically 0.75 mm/cm for sand; 1.00 mm/cm for sandy loam; 1.40 mm/cm for loam; 1.60 mm/cm for clay loam and 1.80 mm/cm for clay).

Refill Point (RFP(mm)=TAW(mm)×f where f is a factor, 0.5 has been found satisfactory for many soils. The RFP is the predetermined moisture content value. It will be understood by those skilled in the art that the factor f varies depending on a variety of circumstances. However, f will generally fall within the range of 0.4 to 0.6.

Optimum Irrigation Event (OIE(mins)=((TAW(mm)−RFP(mm))/PR(mm/hr)×60 where PR is Precipitation rate (mm/hr).

It will be understood by those skilled in the art that further factors may be taken into account to account for local variance.

Each individual site is now registered on the main computer 1 with its basic factors indicated above (TAW, RFP, OIE, PR) and its identification number which tells the system within which sub-area 3 it lies.

The switch 4 is now connected to the pre-existing irrigation controller 5 at each site. Switch 4 is connected across the common wire (or wires) or active bus 9 of pre-existing irrigation controller 5. It will however be understood that this can be done in a variety of ways.

Now a program is entered into the preexisting irrigation controller 5 which calls for the calculated Optimum Irrigation Event to be applied to each site the first 24 hours. Typically this will take place at night.

In this arrangement, the pre-existing irrigation controller 5 is allowed to operate on the first night so that the site is "zeroed" by having its root zone filled with all the moisture it is able to store.

From then on the programming in the main computer 1 maintains the soil moisture budget for each of the sites registered onto it. It does this by communicating with the weather station 12 and the radar 11 and establishing how much water will have been lost by each sub-area 3, i.e. by transpiration of the plants. Loss of water is calculated by conventional methods. This amount is deducted from the soil moisture budget (TAW initially and then the soil moisture budget as calculated at that time) of each site, with additions to the soil moisture budget for each site being made where rain falls in a particular sub-area 3. The result of these calculations is the moisture content value.

When the soil moisture budget being maintained by the system for each site indicates that the soil moisture content has fallen to the Refill Point (predetermined moisture content value) for a particular site, that site is placed in an Action List for that day. Sites on the Action List for any particular day are activated by the system in early evening. This is done by the main computer 1 sending a data string through the numeric paging network of an appropriate telecommunications provider such that the switch 4 changes state as required for a programmed period (typically but not necessarily 20 hours) thus allowing irrigation to occur during that 20 hour period under the influence of pre-existing irrigation controller 5.

After typically 20 hours the switch 4 changes state, which terminates irrigation. Irrigation will not occur again until the data string is once more received from main computer 1 causing the switch 4 to change state and pre-existing irrigation controller 5 to activate irrigation. The soil moisture budget of sites on the Action List is altered to reflect the receipt of the Optimum Irrigation Event during the following day, provided that the irrigation was not interrupted by rain.

If this is a fail wet system, and irrigation is required, main computer 1 is required to energise the requisite switch 4. This will occur during the preferred irrigation time, ie. often at night. Irrigation during the non-preferred irrigation period in such a fail wet system, merely requires the pre-existing irrigation controller 5 to ensure provision of water to the relevant area, as the switches 4 are in a state which allows irrigation to occur.

Should rain fall, it will be detected by the radar 11. If it is outside the programmed operating window of pre-existing irrigation controller 5, it will be passively recorded and up loaded as data each day by the main computer 1. It will then be added to the soil moisture budget of sites in the main computer 1 which recorded the rainfall. Rainfall will therefore delay irrigation until it has been transpired or harvested by the plants or evaporated.

If the rainfall is within the operating window of the pre-existing irrigation controller 5 (that is when irrigation is likely to be occurring) the data accumulating logger connected to (or part of) the radar 11 will contact the main computer 1 and advise that rain is falling in that sub-area 3 or at a particular site. In this case all sites from that sub-area 3 on that evening's action list will be sent a data string causing the switch 4 to change state, thus bringing irrigation within that sub-area 3 to an immediate halt. In the case of an individual site within a sub-area 3, the switch at the site will change state to prevent irrigation at that site. It will therefore be clear that in some situations it will be possible to independently control sites within a sub-area if desired. This may in some circumstances be done by a broadcast call which will be acted upon by all switches 4 in the designated sub-area 3. The main computer 1 will then track the rainfall event and add it to the soil moisture budget of the relevant sites.

The switch 4 operates in the common wire 9 of pre-existing irrigation controller 5. This associated pre-existing irrigation controller 5 can be an inexpensive controller which may have been installed on the irrigation system to be managed prior to adopting the irrigation control system of the invention.

The switch 4 typically consists of, but is not limited to, the following:
  a paging system receiver
  a microprocessor
  a memory area
  a clock
  one or more switching relays.

Switch 4 is capable of receiving a detailed program containing switching instructions for the operation of one or more of the relays. It is capable of receiving a particular string which is intended for it alone, or depending on the structure or content of the transmitted data stream, it can also respond to a broadcast type call intended to simultaneously give rise to a specific action or group of actions within an entire group of switches 4.

The relay of the switch 4 may be either of the normally open or normally closed type depending upon the circumstances.

Further switch 4 is capable of receiving, processing and storing data strings including (but not limited to) the following types of information, which would normally be transmitted (but not necessarily) in the following order:
  1. General call or broadcast recognition characters
  2. Sub-area identification number.
  3. Specific unit recognition or capture code (characters).
  4. Specified task designation characters (normally used to designate tasks the subject of a broadcast call).
  5. Program definition characters of the general type (but not limited to)—relay one close/open at (time) for duration (minutes); on (date);—relay a, close/open at (time); for duration (minutes); on (date).

6. Test time.

7. Lock/unlock code (prevent all irrigation operations until receipt of particular unlock code).

Also included in switch 4 may be an accessible momentary switch which, if pressed or otherwise operated, will allow irrigation operations in the absence of system authorisation for a programmable "Test" time. In other words the switch 4 will restore the integrity of the circuits. This is to allow the associated pre-existing irrigation controller 5 and its in-field irrigation system to be tested.

The word 'comprising' and forms of the word 'comprising' as used in this description and in the claims does not limit the invention claimed to exclude any variants or additions which are obvious to the person skilled in the art and which do not have a material effect upon the invention.

Modifications and improvements to the invention will be readily apparent to those skilled in the art. Such modifications and improvements are intended to be within the scope of this invention.

What is claimed is:

1. An irrigation control system for land comprising:
   (a) at least one monitor to (i) examine rainfall data derived from a radar scanning at least a first area according to predetermined criteria and (ii) to extract weather data which is representative of the scanned rainfall in a sub-area of the first area;
   (b) storage device to store the extracted data; and
   (c) a controller connected directly or indirectly to the monitor and to the storage device to calculate a moisture content value for the sub-area based on said rainfall data, and to regulate the irrigation in a sub-area in accordance with said moisture content.

2. The irrigation control system of claim 1 wherein regulation of irrigation in the sub-area is either by initiating or preventing irrigation of the sub-area depending upon whether the moisture content value is less than or more than the predetermined moisture content value for the sub-area.

3. The irrigation system of claim 1 wherein there is one monitor.

4. The irrigation system of claim 1 wherein the weather conditions measured include solar radiation.

5. The irrigation system of claim 1 wherein the monitor is integrated with the controller.

6. The irrigation system of claim 1 wherein the controller is a computer.

7. The irrigation system of claim 1 wherein the irrigation control system further comprises a local switch in the sub-area to initiate or prevent irrigation in response to signals from the controller.

8. The irrigation system of claim 7 wherein the local switch in the sub-area activates or de-activates a local controller for initiating or preventing the irrigation, in response to signals from the controller.

9. The irrigation system of claim 7 wherein the irrigation control system further comprises an interrupter to interrupt irrigation in the sub-area.

10. The irrigation system of claim 9 wherein the interrupter interrupts irrigation in the sub-area in response to rainfall in the sub-area.

11. The irrigation system of claim 9 wherein the interruption occurs for a period of time determined by the controller.

12. A method of irrigating land is provided comprising the steps of:
   (a) measuring one or more weather conditions in a first area;
   (b) examining rainfall data derived from a radar scanning at least the first area according to predetermined criteria and extracting weather data which is representative of the scanned rainfall in a sub-area of the first area;
   (c) storing the extracted data;
   (d) calculating a moisture content value for the sub-area based on said rainfall and a predetermined moisture content value for the sub-area; and
   (e) regulating the irrigation of the sub-area.

13. The method of claim 12 wherein the regulation of the irrigation of the sub-area is either by initiating or preventing irrigation of the sub-area depending upon whether the moisture content value is less than or more than the predetermined moisture content value for the sub-area.

14. The method of claim 12 wherein the measurement in step (a) is carried out in the same sub-area as that in which the measurement is carried out in step (b).

15. The method of claim 12 wherein the method comprises a further step of: (f) sensing for rainfall in the sub-area during irrigation and interrupting irrigation in response to rainfall in the sub-area for a period of time controlled by the duration and amount of rainfall.

16. The irrigation system of claim 2 further comprising at least one meter to measure one or more weather conditions in said first area wherein the weather conditions measured include solar radiation.

17. The irrigation system of claim 10 wherein the interruption occurs for a period of time determined by the controller.

* * * * *